United States Patent
Ohashi et al.

(10) Patent No.: US 12,092,283 B2
(45) Date of Patent: Sep. 17, 2024

(54) VEHICULAR HEADLAMP WITH COPLANAR LOW-BEAM AND HIGH-BEAM LIGHT SOURCES

(71) Applicant: Ichikoh Industries, Ltd., Isehara (JP)

(72) Inventors: Yuji Ohashi, Isehara (JP); Hiroya Imamura, Isehara (JP); Hirokazu Nozue, Isehara (JP); Eiji Suzuki, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/250,772

(22) PCT Filed: Oct. 29, 2021

(86) PCT No.: PCT/JP2021/039989
§ 371 (c)(1),
(2) Date: Apr. 27, 2023

(87) PCT Pub. No.: WO2022/092255
PCT Pub. Date: May 5, 2022

(65) Prior Publication Data
US 2023/0408056 A1    Dec. 21, 2023

(30) Foreign Application Priority Data
Oct. 30, 2020    (JP) .................. 2020-182585

(51) Int. Cl.
*B60Q 1/04*    (2006.01)
*F21S 41/365*  (2018.01)
*F21W 102/155* (2018.01)

(52) U.S. Cl.
CPC .............. *F21S 41/365* (2018.01); *B60Q 1/04* (2013.01); *F21W 2102/155* (2018.01)

(58) Field of Classification Search
CPC . B60Q 1/04; F21S 41/365; F21S 41/36; F21S 41/147; F21V 7/033; F21W 2102/155
See application file for complete search history.

(56) References Cited

U.S. PATENT DOCUMENTS 8,197,109 B2 *  6/2012  Iwasaki .............. F21S 41/365
                                                 362/298
9,109,779 B2 *  8/2015  Roth .................. F21V 7/0033
(Continued)

FOREIGN PATENT DOCUMENTS

CN    210740260 U    6/2020
CN    210740276 U    6/2020
(Continued)

OTHER PUBLICATIONS

Office Action issued in corresponding Japanese patent application No. 2020-182585 dated Feb. 27, 2024.
(Continued)

*Primary Examiner* — Ismael Negron
(74) *Attorney, Agent, or Firm* — Oblon, McClelland, Maier & Neustadt, L.L.P.

(57) ABSTRACT

A vehicular headlamp includes a first light source for emitting a first light forward; a second light source disposed above the first light source and for emitting a second light forward; a first reflecting surface disposed in front of the first light source for reflecting the first light upward; a second reflecting surface disposed above the second light source for reflecting forward the first light reflected by the first reflecting surface; a third reflecting surface disposed above the second light source and below the second reflecting surface, is connected to the second reflecting surface, for reflecting the second light forward; and a projection lens disposed in front of the first, second, and third reflecting surfaces. The first and second light sources disposed on the same plane.

5 Claims, 4 Drawing Sheets

(56) References Cited

U.S. PATENT DOCUMENTS

| | | | | |
|---|---|---|---|---|
| 9,671,079 B2* | 6/2017 | Honda | ............... | F21S 41/365 |
| 9,863,602 B2* | 1/2018 | Hiki | ............... | F21V 7/0033 |
| 10,393,337 B2* | 8/2019 | Nozue | ............... | F21S 41/147 |
| 10,619,816 B2* | 4/2020 | Reisinger | ............... | F21S 41/147 |
| 10,801,687 B2* | 10/2020 | Laminette | ............... | F21S 41/365 |
| 10,895,357 B2* | 1/2021 | Ishida | ............... | F21S 41/365 |
| 11,536,432 B2* | 12/2022 | Sugihara | ............... | F21S 41/275 |
| 11,713,858 B2* | 8/2023 | Nishimura | ............... | F21S 41/143 |
| | | | | 362/509 |

FOREIGN PATENT DOCUMENTS

| | | |
|---|---|---|
| JP | 2007-324002 A | 12/2007 |
| JP | 2018-85217 A | 5/2018 |
| JP | 2018-098105 A | 6/2018 |

OTHER PUBLICATIONS

Office Action issued in corresponding European patent application No. 21886372.8 dated Feb. 16, 2024.
International Search Report mailed on Nov. 30, 2021 in PCT/JP2021/039989 filed on Oct. 29, 2021.

\* cited by examiner

VEHICULAR HEADLAMP WITH COPLANAR LOW-BEAM AND HIGH-BEAM LIGHT SOURCES

TECHNICAL FIELD

The present invention relates to a vehicular headlamp.

BACKGROUND ART

As a vehicular headlamp, for example, a configuration in which a first light source for forming a low beam pattern in front of a vehicle and a second light source for forming a high beam pattern illuminating a distant area are installed in a single unit is known (see, for example, PTL 1).

CITATION LIST

Patent Literature

PTL 1: Japanese Patent Laid-open No. 2018-98105

SUMMARY OF THE INVENTION

Problems to be Solved by the Invention

A vehicular headlamp described in PTL 1 has a configuration in which the first light source and the second light source are disposed on different planes. In this configuration, the number of components increases because separate mounting substrates need to be formed for the first and second light sources.

The present invention has been made in view of the above, and an object of the present invention is to provide a vehicular headlamp in which increase in the number of components can be suppressed.

Means for Solving the Problem

A vehicular headlamp according to the present invention includes: a first light source that emits first light forward; a second light source that is disposed above the first light source and emits second light forward; a first reflecting surface that is disposed in front of the first light source, and reflects the first light upward; a second reflecting surface that is disposed above the second light source, and reflects, forward, the first light which reaches from the first light source via the first reflecting surface; a third reflecting surface that is disposed above the second light source and below the second reflecting surface in a state of extending in a front-rear direction, is connected to the second reflecting surface at an edge portion so as to share the edge portion with the second reflecting surface, and reflects the second light from the second light source forward; and a projection lens that is disposed in front of the first reflecting surface, the second reflecting surface, and the third reflecting surface, and irradiates the first light and the second light forward, and the first light source and the second light source are disposed on the same plane.

In the above vehicular headlamp, the edge portion may be disposed in a vicinity of a focal point of the projection lens, the second light source may be disposed below an optical axis of the projection lens and behind the focal point of the projection lens, and the first light source and the second light source may be disposed such that respective emission axes of the first light and the second light may face forward and diagonally upward.

The above vehicular headlamp may further include a substrate having a planar mounting surface mounted with the first light source and the second light source thereon, wherein the substrate may be disposed such that a normal line of the mounting surface face forward and diagonally upward.

In the above vehicular headlamp, the first reflecting surface, the second reflecting surface and the third reflecting surface may be formed on a surface of a single component.

In the above vehicular headlamp, the first light may be light for forming a low beam pattern in front of a vehicle, the second light may be light for forming a high beam pattern in front of the vehicle, and the edge portion may have a cutoff formation portion for forming a cutoff line in the low beam pattern.

Effect of the Invention

According to the present invention, it is possible to provide a vehicular headlamp in which increase in the number of components can be suppressed.

MODE FOR CARRYING OUT THE INVENTION

Hereinafter, an embodiment of a vehicular headlamp according to the present invention will be described with reference to the drawings. The present invention is not limited by this embodiment. Components in the following embodiment include those that can be easily replaced by those skilled in the art, or those that are substantially the same.

Figure 1:
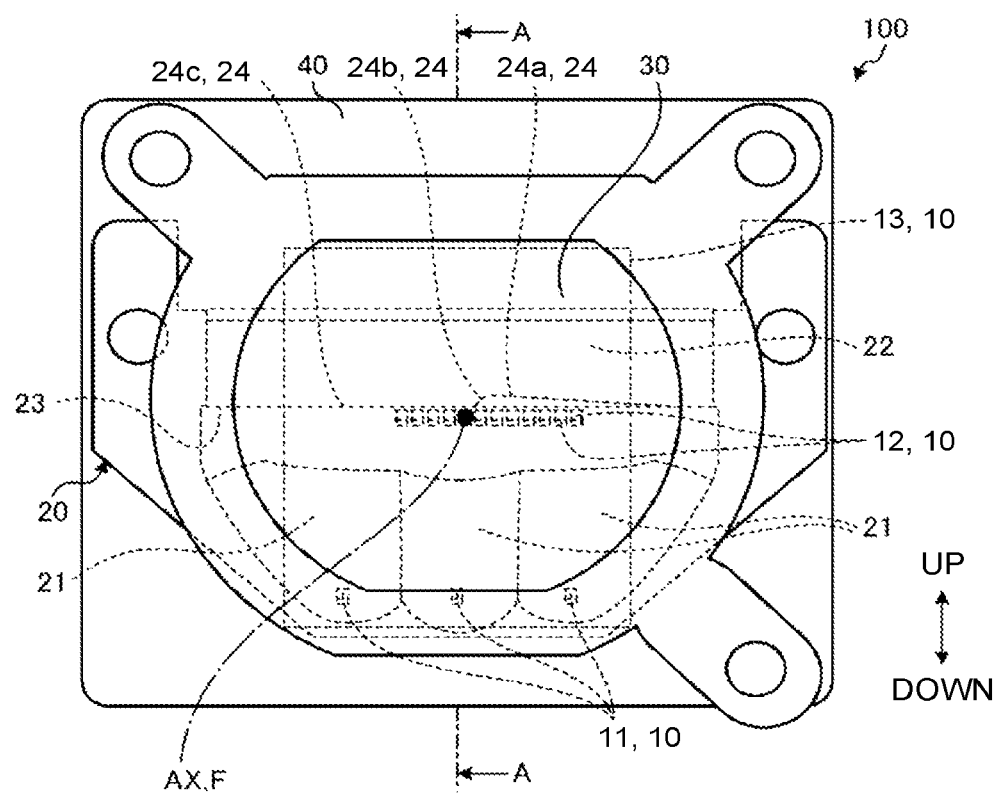
FIG. 1 is a front view illustrating an example of a vehicular headlamp according to this embodiment.
Figure 2:
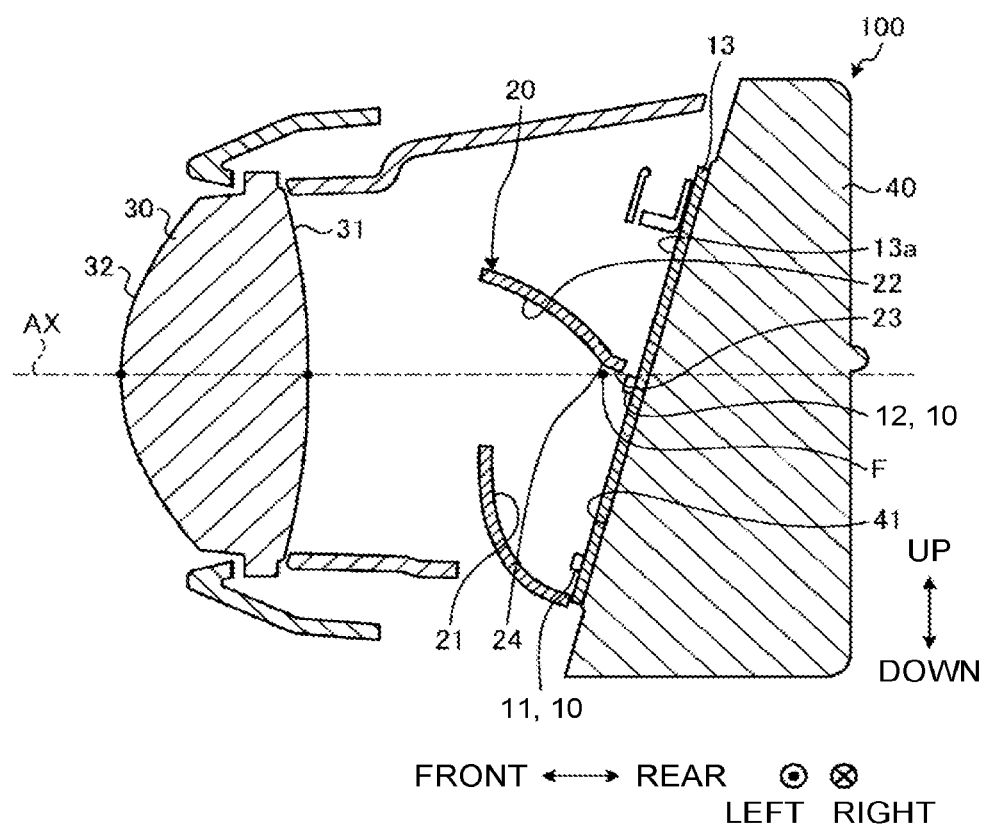
FIG. 2 is a sectional view taken along A-A arrows in FIG. 1.

FIG. 1 and FIG. 2 are diagrams illustrating an example of a vehicular headlamp 100 according to this embodiment. FIG. 1 is a front view illustrating an example of the vehicular headlamp 100, and FIG. 2 is a sectional view taken along A-A arrows in FIG. 1. As illustrated in FIG. 1 and FIG. 2, the vehicular headlamp 100 includes a light source unit 10, a reflector 20, a projection lens 30, and a holding portion 40.

The light source unit 10 has first light sources 11, second light sources 12, and a substrate 13. Each first light source 11 emits first light L1 for forming a low beam pattern in front of the vehicle, for example. The second light source 12 emits second light L2 for forming a high beam pattern in front of the vehicle, for example.

For the first light sources 11 and the second light sources 12, for example, semiconductor-type light sources such as LEDs are used. A plurality of the first light sources 11 and a plurality of the second light sources 12 are provided, and are arranged side by side in the right-left direction. One of the first light sources 11 is disposed in the center in the right-left direction, and other first light sources 11 are disposed one by one on the both sides in the right-left direction, that is, three in total are disposed. The number of the first light sources 11 is not limited to three, but may be two or less or four or more. The plurality of second light sources 12 are disposed such that intervals between the second light sources 12 in the right-left direction are narrower than intervals between the first light sources 11. The second light sources 12 may, for example, have independently controllable lighting conditions. The first light sources 11 are disposed below the second light sources 12. In other words, the second light sources 12 are disposed above the first light sources 11. Thus, the first light sources 11 and the second light sources 12 are disposed vertically.

The first light sources 11 and the second light sources 12 are mounted on a mounting surface 13a of the substrate 13. In this embodiment, the first light sources 11 and the second light sources 12 are mounted on the single substrate 13. Therefore, a separate substrate does not need to be formed for each light source, and it is possible to reduce the number of components. The mounting surface 13a is planar. The substrate 13 is disposed on a substrate support surface 41 (see FIG. 2) of the holding portion 40 described below. The substrate 13 is disposed along the substrate support surface 41. The substrate 13 is disposed with the mounting surface 13a facing forward and diagonally upward. The first light sources 11 and the second light sources 12 are disposed with light emitting surfaces 11a and light emitting surfaces 12a facing forward, more specifically, facing forward and diagonally upward. Therefore, the first light sources 11 and the second light sources 12 are arranged such that emission axes of the first light L1 and the second light L2 each face forward and diagonally upward.

The reflector 20 reflects the first light L1 from each first light source 11 and the second light L2 from each second light source 12 toward the projection lens 30. As illustrated in FIG. 1, the reflector 20 is provided as a single component and is fixed to the holding portion 40. The fact that the reflector 20 is a single member enables the positions of first reflecting surfaces 21, a second reflecting surface 22, and a third reflecting surface 23, described below, to be precisely defined.

Figure 3:
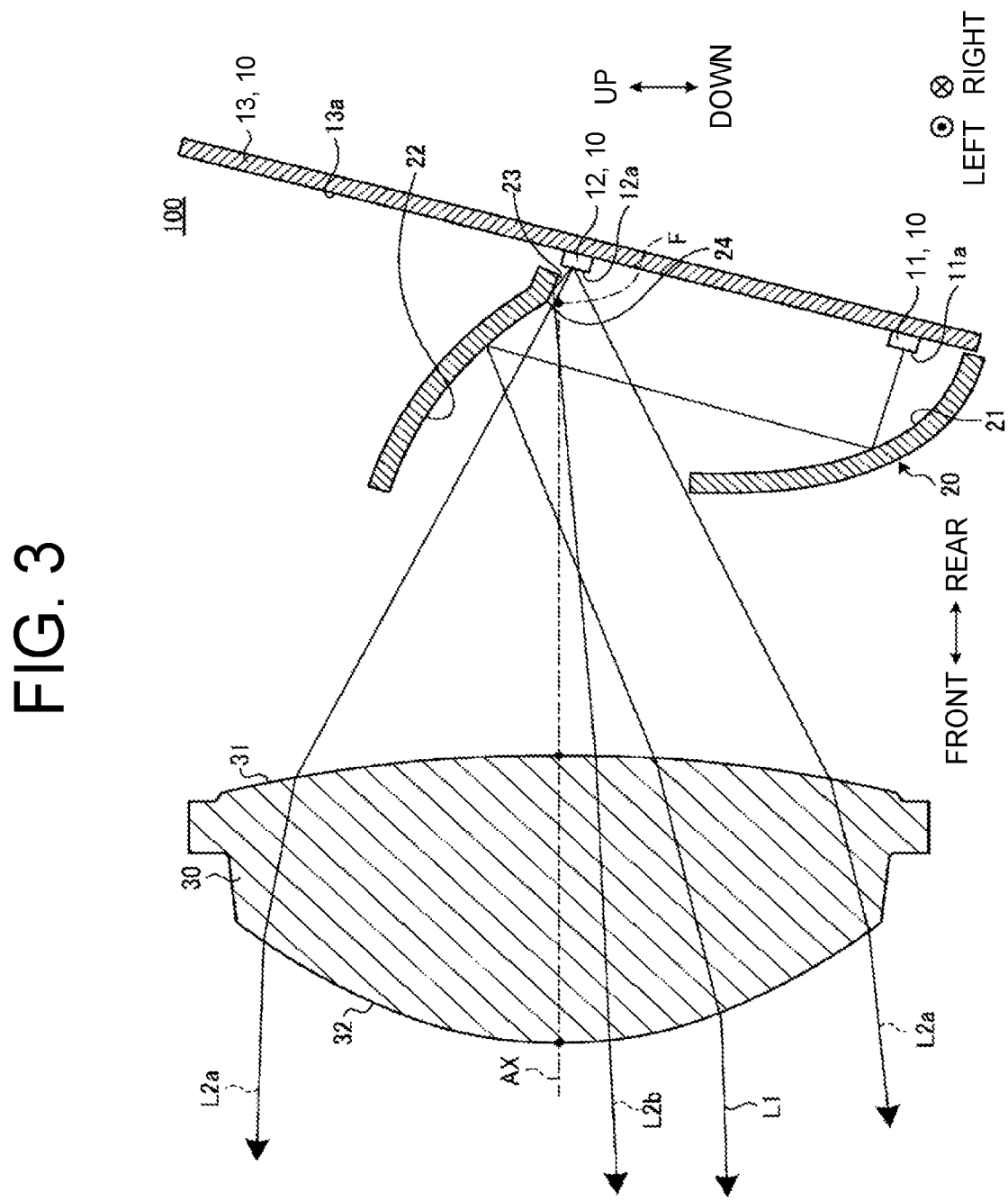
FIG. 3 is an enlarged diagram illustrating a main part of FIG. 2.

FIG. 3 is an enlarged diagram illustrating a main part of FIG. 2. As illustrated in FIG. 2 and FIG. 3, the reflector 20 has the first reflecting surfaces 21, the second reflecting surface 22, and the third reflecting surface 23.

The first reflecting surfaces 21 are disposed in front of the first light sources 11. Each first reflecting surface 21 reflects the first light upward. Each first reflecting surface 21 has such a shape as to extend forward from the substrate 13 and be curved upward so as to be convex toward the front. The first reflecting surfaces 21 each consist of a free-form surface based on an ellipsoid or a paraboloid, for example. As illustrated in FIG. 1, the first reflecting surface 21 is provided corresponding to the position of each first light source 11. In this embodiment, one of the first reflecting surfaces 21 is disposed in the center in the right-left direction, and other first reflecting surfaces 21 are disposed one by one on the both sides in the right-left direction, that is, three in total are disposed. The first reflecting surface 21 is not limited to the configuration in which the first reflecting surface 21 is provided corresponding to the position of each first light source 11.

The second reflecting surface 22 is disposed above the second light sources 12. The first light which reaches from each first light source 11 through the corresponding first reflecting surface 21 is reflected forward. The second reflecting surface 22 has a curved shape that is convex on the upper side. The second reflecting surface 22 consists of a free-form surface based on an ellipsoid, a paraboloid, or a plane, for example. The curvature of the second reflecting surface 22 may be the same as or different from that of each first reflecting surface 21.

The second reflecting surface 22 forms an edge portion 24 at a rear end. The edge portion 24 is shared with the third reflecting surface 23, described below. As illustrated in FIG. 1, the edge portion 24 has a first straight portion 24a, an oblique portion 24b, and a second straight portion 24c. The first straight portion 24a and the second straight portion 24c are used to form horizontal cutoff lines CLa and CLc (see FIG. 5) of the low beam pattern. The oblique portion 24b is used to form an oblique cutoff line CLb (see FIG. 5) of the low beam pattern. The edge portion 24 is disposed at a focal point F of the projection lens 30 or in the vicinity of the focal point F, as described below. The first straight portion 24a and the second straight portion 24c may have a curved shape along an image plane by the projection lens 30.

The third reflecting surface 23 is disposed above the second light source 12 and below the second reflecting surface 22. The third reflecting surface 23 is disposed downward. The third reflecting surface 23 reflects, forward, a portion of the second light emitted from each second light source 12, for example, an upward component of the second light from each second light source 12. The third reflecting surface 23 shares the edge portion 24 with the second reflecting surface 22 and is connected to the second reflecting surface 22 at the edge portion 24. The third reflecting surface 23 extends from the edge portion 24 toward the substrate 13, that is, rearward in the front-rear direction. The third reflecting surface 23 is disposed in the vicinity of the second light sources 12.

The projection lens 30 is disposed in front of the reflector 20. The projection lens 30 has an incident surface 31 and an emission surface 32. On the incident surface 31, the first light L1 and the second light L2 from the reflector 20 are incident. The emission surface 32 emits the first light L1 and the second light L2 incident on the incident surface 31 to the front of the vehicle to form a low beam pattern and a high beam pattern. The projection lens 30 may be provided with a light diffusion portion (not illustrated) on at least one of the incident surface 31 and the emission surface 32. This light diffusion portion diffuses the light incident on the incident surface 31 and the light emitted from the emission surface 32 in the right-left direction or the vertical direction.

The holding portion 40 has the substrate support surface 41 that supports the substrate 13, at the front. The substrate support surface 41 is planar, for example, and is disposed facing forward and diagonally upward. The holding portion 40 dissipates heat generated by the first light sources 11 and the second light sources 12. The holding portion 40 may be provided with a heat dissipating part (not illustrated) such as fins at the rear, the top or the bottom.

Figure 4:
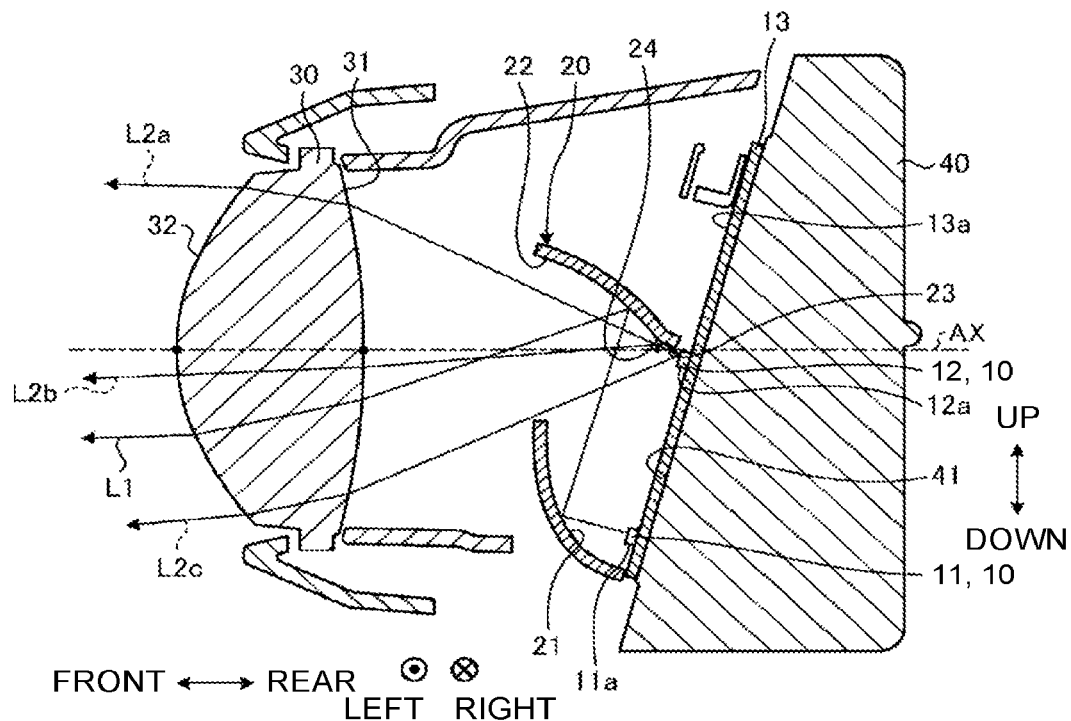
FIG. 4 is a diagram illustrating an example of operation of the vehicular headlamp.

Now, operation of the vehicular headlamp 100 configured as described above will be described. FIG. 4 is a diagram illustrating an example of the operation of the vehicular headlamp 100. The first light sources 11 of the vehicular headlamp 100 are turned on, so that the first light L1 is emitted from the light emitting surfaces 11a. As illustrated in FIG. 4, the first light L1 is reflected upward by each first reflecting surface 21, reflected forward by the second reflecting surface 22, and reaches the projection lens 30. The first light L1 that reaches the projection lens 30 is irradiated to the front of the vehicle by the projection lens 30.

Figure 5:
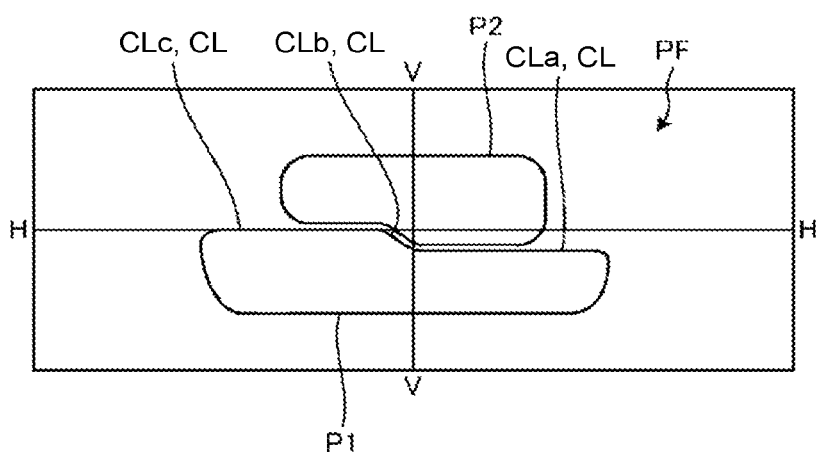
FIG. 5 is a diagram illustrating an example of a light distribution pattern emitted to a virtual screen in front of a vehicle.

FIG. 5 is a diagram illustrating an example of a light distribution pattern PF irradiated on a virtual screen in front of the vehicle, and illustrates a pattern corresponding to a vehicle which drives on the left side of a road. In FIG. 5, a V-V line indicates a vertical line of the screen and an H-H line indicates a right-left horizontal line on the screen. Herein, an intersection of the vertical line and the horizontal line is assumed to be a reference position in the horizontal direction.

As illustrated in FIG. 5, the first light L1 emitted from the projection lens 30 forms a low beam pattern P1 in front of the vehicle. A cutoff line CL is formed by light that passes through the edge portion 24 of the first light L1. The cutoff line CL includes the horizontal cutoff lines CLa and CLc, and the oblique cutoff line CLb.

The second light sources 12 of the vehicular headlamp 100 are turned on, so that the second light L2 is emitted from the light emitting surfaces 12a. As illustrated in FIG. 3, a portion of the second light L2, which is emitted forward (hereafter referred to as second light L2a), passes below the third reflecting surface 23 and reaches the projection lens 30. In this case, a portion of the second light L2a reaches the projection lens 30 beyond the vicinity of the edge portion 24 which is a tip of the third reflecting surface 23. A portion of the second light L2, which is emitted upward (hereinafter referred to as second light L2b), is reflected forward by the third reflecting surface 23 and reaches the projection lens 30. A portion of the second light L2, which is emitted downward (hereinafter referred to as the second light L2c), passes through information on the first reflecting surface 21 and reaches the projection lens 30.

The second light L2a, the second light L2b, and the second light L2c that reach the projection lens 30 are irradiated to the front of the vehicle by the projection lens 30, and form a high beam pattern P2, as illustrated in FIG. 5. The second light L2c that reaches the lower side of the projection lens 30 is irradiated on an upper part of the high beam pattern P2.

In this embodiment, the first light sources 11 and the second light sources 12 are arranged such that the emission axes of the first light L1 and the second light L2 face forward and diagonally upward. Therefore, each first light source 11 can be arranged such that the first light L1 passes through the edge portion 24 of the second reflecting surface 22, while each second light source 12 can be arranged such that the emission axis of the second light L2 is directed toward the vicinity of the edge portion 24. With this configuration, a portion of the second light L2a passes near the edge portion 24 and reaches the projection lens 30. Therefore, a lower portion of the high beam pattern P2 is formed near the horizontal cutoff line CLc of the low beam pattern P1. Therefore, the high beam pattern P2 can be prevented from being formed above and away from the low beam pattern P1. In addition, the low beam pattern P1 and the high beam pattern P2 can be partially overlapped to increase the altitude in the center.

As described above, the vehicular headlamp 100 according to this embodiment includes: the first light sources 11 that emit the first light L1 forward; the second light sources 12 that are disposed above the first light sources 11 and emit the second light L2 forward; the first reflecting surfaces 21 that are disposed in front of the first light sources 11, and reflect the first light L1 upward; the second reflecting surface 22 that is disposed above the second light sources 12, and reflects, forward, the first light L1 which reaches from the first light sources 11 via the first reflecting surfaces 21; the third reflecting surface 23 that is disposed above the second light sources 12 and below the second reflecting surface 22 in a state of extending in the front-rear direction, is connected to the second reflecting surface 22 at an edge portion 24 so as to share the edge portion 24 with the second reflecting surface 22, and reflects the second light L2 from the second light sources 12 forward; and the projection lens 30 that is disposed in front of the first reflecting surfaces 21, the second reflecting surface 22, and the third reflecting surface 23, and irradiates the first light L1 and the second light L2 forward, and the first light sources 11 and the second light sources 12 are disposed on the same plane, and the second light sources 12 are disposed below the optical axis AX of the projection lens 30.

According to this configuration, the first light sources 11 and the second light sources 12 are disposed on the same plane, and therefore the first light sources 11 and the second light sources 12 can be mounted on the single substrate 13. Therefore, a separate substrate does not need to be formed for each light source. Consequently, it is possible to prevent suppress in the number of components. In addition, the second light L2 which travels upward from the second light sources 12 is reflected forward by the third reflecting surface 23, and therefore it is possible to suppress the loss of the second light L2. Further, the first light sources 11 and the second light sources 12 are disposed vertically and face forward, so that it is possible to reduce the size in the front-rear direction compared to a case where the first light sources 11 and the second light sources 12 are directed vertically.

In the vehicular headlamp 100 according to this embodiment, the edge portion 24 is disposed in the vicinity of the focal point of the projection lens 30, the second light sources 12 are disposed below the optical axis AX of the projection lens 30 and behind the focal point F of the projection lens 30, and the first light sources 11 and the second light sources 12 are disposed such that respective emission axes of the first light L1 and the second light L2 face forward and diagonally upward. According to this configuration, the first light sources 11 can be arranged such that the first light L1 passes through the edge portion 24 of the second reflecting surface 22, while the second light sources 12 can be arranged such that the emission axis of the second light L2 is directed toward the vicinity of the edge portion 24. Consequently, a portion of the second light L2 passes through the vicinity of the edge portion 24 to reach the projection lens 30, and therefore the pattern by the second light L2 can be formed in the vicinity of the upper side of the pattern by the first light L1.

The vehicular headlamp 100 according to this embodiment further includes the substrate 13 having the planar mounting surface 13a mounted with the first light sources 11 and the second light sources 12 thereon, wherein the substrate 13 is disposed such that a normal line of the mounting surface 13a face forward and diagonally upward. According to this configuration, it is possible to set the orientation and the position of each of the first light sources 11 and the second light sources 12 with high precision.

In the vehicular headlamp 100 according to this embodiment, the first reflecting surfaces 21, the second reflecting surface 22, and the third reflecting surface 23 are formed on a surface of a single component. In this configuration, the positional relation among the first reflecting surfaces 21, the second reflecting surface 22, and the third reflecting surface 23 can be precisely defined compared to a configuration in which the first reflecting surfaces 21, the second reflecting surface 22, and the third reflecting surface 23 are formed in separate components.

In the vehicular headlamp 100 according to this embodiment, the first light L1 is light for forming the low beam pattern P1 in front of a vehicle, the second light L2 is light for forming the high beam pattern P2 in front of the vehicle, and the edge portion 24 has a cutoff formation portion (the first straight portion 24a, the oblique portion 24b, the second straight portion 24c) for forming a cutoff line CL in the low beam pattern P1. In this configuration, the lower portion of the high beam pattern P2 is formed in the vicinity of the horizontal cutoff line CLc of the low beam pattern P1. Consequently, the high beam pattern P2 can be prevented from being formed above and away from the low beam pattern P1.

The technical scope of the present invention is not limited to the above embodiment, and modifications can be made as appropriate without departing from the scope of the present invention. For example, the first reflecting surfaces 21, the second reflecting surface 22, and the third reflecting surface 23 are formed on the surface of the single component in the above embodiment. However, the present invention is not limited to this. At least one of the first reflecting surfaces 21, the second reflecting surface 22, and the third reflecting surface 23 may be formed on a separate component.

In the above embodiment, the first light sources 11 and the second light sources 12 are arranged such that the respective emission axes of the first light L1 and the second light L2 face forward and diagonally upward. However, the present invention is not limited to this. The first light sources 11 and the second light sources 12 may be arranged such that the respective emission axes of the first light L1 and the second light L2 are directed to the direction along a front horizontal surface or forward and diagonally downward.

In the above embodiment, the first light L1 is light for forming the low beam pattern P1 in front of the vehicle, the second light L2 is light for forming the high beam pattern P2 in front of the vehicle. However, the present invention is not limited to this combination. For example, the second light L2 may be an auxiliary pattern that is irradiated above a horizontal line, such as an overhead pattern. In this case, the first light L1 may be the high beam pattern P2.

DESCRIPTION OF REFERENCE NUMERALS

AX optical axis
CL cutoff line
CLa, CLc horizontal cutoff line
CLb oblique cutoff line
F focal point
L1 first light
L2, L2a, L2b second light
PF light distribution pattern
P1 low beam pattern
P2 high beam pattern
10 light source unit
11 first light source
11a, 12a light emitting surface
12 second light source
13 substrate
13a mounting surface
20 reflector
21 first reflecting surface
22 second reflecting surface
23 third reflecting surface
24 edge portion
24a first straight portion
24b oblique portion
24c second straight portion
30 projection lens
31 incident surface
32 emission surface
40 holding portion
41 substrate support surface
100 vehicular headlamp

The invention claimed is:

1. A vehicular headlamp comprising:
a first light source that emits first light forward;
a second light source that is disposed above the first light source and emits second light forward;
a first reflecting surface that is disposed in front of the first light source, and reflects the first light upward;
a second reflecting surface that is disposed above the second light source, and reflects, forward, the first light which reaches from the first light source via the first reflecting surface;
a third reflecting surface that is disposed above the second light source and below the second reflecting surface in a state of extending in a front-rear direction, is connected to the second reflecting surface at an edge portion so as to share the edge portion with the second reflecting surface, and reflects the second light from the second light source forward; and
a projection lens that is disposed in front of the first reflecting surface, the second reflecting surface, and the third reflecting surface, and irradiates the first light and the second light forward, wherein
the first light source and the second light source are disposed on the same plane.

2. The vehicular headlamp according to claim 1, wherein
the edge portion is disposed in a vicinity of a focal point of the projection lens,
the second light source is disposed below an optical axis of the projection lens and behind the focal point of the projection lens, and
the first light source and the second light source are disposed such that respective emission axes of the first light and the second light face forward and diagonally upward.

3. The vehicular headlamp according to claim 1, further comprising
a substrate having a planar mounting surface mounted with the first light source and the second light source thereon, wherein
the substrate is disposed such that a normal line of the mounting surface faces forward and diagonally upward.

4. The vehicular headlamp according to claim 1, wherein
the first reflecting surface, the second reflecting surface and the third reflecting surface are formed on a surface of a single component.

5. The vehicular headlamp according to claim 1, wherein
the first light is light for forming a low beam pattern in front of a vehicle,
the second light is light for forming a high beam pattern in front of the vehicle, and
the edge portion has a cutoff formation portion for forming a cutoff line in the low beam pattern.

* * * * *